(12) United States Patent
Scully et al.

(10) Patent No.: US 9,715,805 B1
(45) Date of Patent: *Jul. 25, 2017

(54) WIRELESS PERSONAL SAFETY DEVICE

(71) Applicant: Micro Apps Group Inventions LLC, Colchester, VT (US)

(72) Inventors: Jack T. Scully, Colchester, VT (US); Mark Schneider, Williston, VT (US)

(73) Assignee: Micro Apps Group Inventions, LLC

( * ) Notice: Subject to any disclaimer, the term of this patent is extended or adjusted under 35 U.S.C. 154(b) by 0 days.

This patent is subject to a terminal disclaimer.

(21) Appl. No.: 15/475,414

(22) Filed: Mar. 31, 2017

Related U.S. Application Data (63) Continuation-in-part of application No. 14/585,790, filed on Dec. 30, 2014, now Pat. No. 9,615,235.

(51) Int. Cl.
| | | |
|---|---|---|
| *G08B 15/00* | (2006.01) |
| *G08B 21/22* | (2006.01) |
| *G08B 21/02* | (2006.01) |
| *G08B 3/10* | (2006.01) |
| *G08B 21/18* | (2006.01) |
| *H04L 29/06* | (2006.01) |
| *H04W 4/22* | (2009.01) |
| *H04W 76/02* | (2009.01) |
| *G01S 19/13* | (2010.01) |
| *H04B 17/318* | (2015.01) |

(Continued)

(52) U.S. Cl.
CPC ............ *G08B 15/004* (2013.01); *F41H 9/10* (2013.01); *F41H 13/0018* (2013.01); *G01S 19/13* (2013.01); *G08B 3/1008* (2013.01); *G08B 21/0269* (2013.01); *G08B 21/182* (2013.01); *G08B 21/22* (2013.01); *H04B 17/318* (2015.01); *H04L 65/4069* (2013.01); *H04W 4/22* (2013.01); *H04W 76/023* (2013.01); *H04W 4/008* (2013.01)

(58) Field of Classification Search
CPC ...... G08B 25/016; G08B 21/22; G08B 25/10; G08B 13/19621; G08B 15/004; G08B 21/02; H04W 4/22; H04W 76/007
See application file for complete search history.

(56) References Cited

U.S. PATENT DOCUMENTS

| | | | | |
|---|---|---|---|---|
| 8,531,526 B1 * | 9/2013 | Spence | .................. | H04N 7/183 348/158 |
| 2002/0057915 A1 * | 5/2002 | Mann | ...................... | E03C 1/057 396/661 |

(Continued)

*Primary Examiner* — Nam Huynh
(74) *Attorney, Agent, or Firm* — H. Jay Spiegel (57) ABSTRACT

A personal protective device is combined with a cellular telephone. Activation of either device causes activation of the other device. Activation is achieved by a switch or voice command. Upon activation, a message asking for assistance at the present location is sent to a previously agreed upon emergency contact. The smartphone also starts both audio and video recording, which are also part of the data sent to the emergency contact person or service. Additionally, the personal protective devices are integrated into a unit that may combine such items as a protective spray, Taser, strobe light, dye pack, siren and other deterrent technologies to ward off would-be attackers. These devices are integrated into a hand held unit that can be unobtrusively worn or carried in a purse or pocket or in the user's hand. An optical safety device is included to protect the user from a potential assailant approaching from rearward.

20 Claims, 10 Drawing Sheets

(51) Int. Cl.
    *F41H 9/10*     (2006.01)
    *F41H 13/00*     (2006.01)
    *H04W 4/00*     (2009.01)

(56) References Cited

U.S. PATENT DOCUMENTS

| | | | | |
|---|---|---|---|---|
| 2009/0127283 | A1* | 5/2009 | Smith | F41H 9/10 222/25 |
| 2011/0255746 | A1* | 10/2011 | Berkovich | G06F 17/30247 382/103 |
| 2014/0087681 | A1* | 3/2014 | Hymowitz | H04W 4/22 455/404.1 |
| 2014/0145847 | A1* | 5/2014 | Jenkins | G08B 13/1427 340/572.1 |
| 2014/0268477 | A1* | 9/2014 | Hamilton | F41H 13/0018 361/232 |
| 2015/0069082 | A1* | 3/2015 | Breeden | F41H 9/10 222/1 |

\* cited by examiner

WIRELESS PERSONAL SAFETY DEVICE

This application is a Continuation-in-Part of application Ser. No. 14/585,790, filed on Dec. 30, 2014. The present invention relates to a wireless personal safety device. Every day, people are exposed to situations in which personal safety may be in jeopardy: while strolling on city sidewalks, hurrying to one's car at night, looking for one's car in a parking garage, jogging on a lonely road, walking the dog out at night, getting lost outdoors, taking a short cut down a deserted street, getting waylaid by a vicious dog, hearing footsteps following one, waiting for help when one's car breaks down, making a wrong turn in a dangerous neighborhood etc. In today's world people need a security companion.

BACKGROUND OF THE INVENTION

Statistically 33% of women in the USA will be violently victimized at least once in their lifetimes. The Justice Department counted 4.9 million violent crimes involving over 2.7 million victims in 2010. It estimates there were over 467,000 firearm victims in 2011. Kids Fighting Chance, a children's advocacy group, reports one child is abducted or reported missing every 40 minutes or 800,000 times per year.

According to criminal deterrence theory, an attack occurs after the criminal makes a cost-benefit analysis. He will act if the benefit outweighs expected consequence. Criminals also know the chances that the police will be in earshot during an attack are low.

Calls to the police are not sufficient for deterrence. Most callers assume that law enforcement will respond before a criminal act occurs. Statistics indicate otherwise. Law enforcement rarely breaks up a street crime. More often than not, its role is pursuit, investigation and witness for prosecution of the criminal act.

The present invention is in the field of personal safety and more particularly for personal protective devices, particularly as combined with cellular telephones and more particularly when a smartphone is connected to a separate personal protective device via a network.

The prior art known to Applicants takes advantage of the latest technology made available by battery powered cellular phones. This includes telephony, the ability to capture pictures, videos and audio, Global Positioning System (GPS) location capabilities, and the ability to run software applications on built-in processing units. Some prior art inventions disclose holders, attachments and cases for cellular phones that allow additional personal safety devices to be physically linked to the cellular phone. This makes the combined device bulkier, heavier and less useful as a cellular phone. Some of them provide for personal safety device activation once a panic button is pushed, but the integration is not complete. Other disclosures include voice activated panic buttons, but it is known that voices under stress cannot always be recognized, even by trained software. Finally, because cellular phone designs are not standardized, different phone implementations make a common attachment means difficult, if not impossible.

US Patent Application 2008/0064339, Mar. 13, 2008, to Cavalier, describes a personal safety device formed by combining a modified cellular telephone with a personal protective spray, such as pepper spray. Activation of the spray causes the cellular telephone to automatically alert emergency response personnel and provides them with cellular phone location via GPS in the phone. It requires modification of the cellular phone and does not work in conjunction with other personal safety devices over a local network.

U.S. Pat. No. 8,472,915, Jun. 25, 2013, to DiPerna et al., also describes a cellular phone with personal protective spray and a panic button. When the button is activated, the personal protective spray is released and the phone records audio and/or video for transmission, transmits the data to emergency response personnel, and provides them with cellular phone location via GPS in the phone. It requires attaching devices to the phone or modification of the cellular phone and does not work in conjunction with other personal safety devices over a local network.

US Patent Application 2007/0293186, Dec. 20, 2007, to Lehmann, describes a portable device that includes the ability to biometrically identify the user. The portable device can be a cellular phone with integrated cameras, sound recorders, and/or biometric authentication mechanisms that utilizes GPS to determine geographic location. Data communication in the form of GPS location data, messages, videos, pictures, etc. can be performed over many types of networks including local area networks (LANs). LANs however, are not meant for personal area network use. Lehmann's invention does not work in conjunction with other personal safety devices over a personal area network.

US Patent Application 2010/0283609, Nov. 11, 2010, to Remer, describes a personal safety system that provides image, audio, and data capture of a perpetrator of a crime against the user. Data is stored at a secure remote location. The device alerts the perpetrator that the information has been captured, thus discouraging the crime. Remers invention does not work in conjunction with other personal safety devices over a personal area network.

US Patent Application 2012/0299711, Nov. 29, 2012, to Manning, describes a personal safety and alarm system including a siren/strobe light, and a pepper spray container in a holder. The holder can be detached. The holder can reside on a stand or be placed in a pocket. Manning's invention does not work in conjunction with other personal safety devices over a personal area network.

US Patent Application 2013/0040596, Feb. 14, 2013, to Paim et al., describes a method that allows a smartphone user to easily and properly share his status during distress situations with people who can better help him contextually and reliably. The Paim invention, while utilizing many network methods, does not work in conjunction with other personal safety devices over a personal area network.

US Patent Application 2013/0257612, Oct. 3, 2013, to Finet, describes a personal alert safety system worn by a user. An accelerometer in the system detects movement and controls an alarm device. The Finet invention does not use a cellular device and does not work in conjunction with other personal safety devices over a personal area network.

US Patent Application 2013/0260825, Oct. 3, 2013, to Hagenstad, describes many of the previously described components. The cellular phone has a panic button which can activate audio and video recording, start a siren, flash lights and contact emergency personnel with GPS location data. These capabilities can also be deployed in an attachable cellular phone case. The Hagenstad invention does not work in conjunction with other personal safety devices over a personal area network.

U.S. Pat. No. 4,982,645, Jan. 8, 1991, to Abboud, describes a stun gun and irritant ejecting spray combination. The Abboud invention does not work over a personal area network.

U.S. Pat. No. 8,466,795, Jun. 18, 2013, U.S. Pat. No. 8,149,124, Apr. 3, 2012, U.S. Pat. No. 6,624,754, Sep. 23, 2003 and 6239700, May 29, 2001 to Hoffman et al., describe a signaling system that provides an alarm for an individual in distress combined with a locating and tracking system, possibly by cellular phone, to alert and direct appropriate personnel to the needs of the individual in distress and to monitor the location of that individual. The system includes a portable signaling unit, a remote alarm switch device, a central dispatch station, and makes use of a wireless communication system. The portable signaling unit and the remote alarm switch may be adapted to be worn at different locations on the person's body. The remote alarm switch may be concealed in the form of a wristband or in the form of any other object such as a broach, pendant, or keychain. Even though a wireless remote is described that is separate from the cellular phone, nowhere is it mentioned that the wireless remote contains other personal safety devices nor do these devices work over a personal area network.

The following patents are also known to Applicants: U.S. Pat. Nos. 6,198,390, 6,072,396, 5,559,520, 5,515,419, 5,461,390, 5,396,227, 5,357,254, 5,334,974, 5,225,842, 5,225,809, 5,196,825, 5,027,314, 5,021,794, 4,885,571, 4,918,432, 4,952,913, 4,819,860, 4,818,998, 4,799,062, 4,744,083, 4,839,656, 4,965,586 and 4,694,284. Many of these references describe various safety systems utilizing cellular networks. None disclose cellular phone based personal safety devices that work in conjunction with other personal safety devices over a personal area network. While these devices fulfill their respective, particular objectives and requirements, the aforementioned patents do not disclose the present invention.

SUMMARY OF THE INVENTION

The present invention relates to a wireless personal safety device. In these respects, the combination cellular phone and personal safety device according to the present invention substantially departs from the conventional concepts and designs of the prior art, and in so doing provides an apparatus primarily developed for the purpose of providing a means of communication and a means of self-defense in one unit.

The present invention includes the following interrelated objects, aspects and features:

(1) In a first aspect, the present invention contemplates a wireless personal safety device that is self-contained but, when activated, communicates with a cellular telephone while also providing self-defense capability. It may be contained within a housing that may be held and gripped in a user's hand.

(2) In the preferred embodiment, the personal safety device includes a shocking mechanism and a sprayer designed to spray a substance for self-defense purposes such as pepper spray or tear gas.

(3) In order to operate the present invention, the personal safety software application is downloaded into a user's cellular telephone (cell phone). Among other things, in downloading the software, a variety of options may be selected such as, for example, contact information for the user, social media contact information, whether 911 emergency calling is to be enabled.

(4) In another aspect, the software provides the capability of activating a separation alarm. Thus, if the cell phone and the personal safety device are separated by a preset distance, for a pre-set time, an alarm can be triggered allowing a third party site such as the police to track the user's location.

(5) The personal safety device may also be provided with a panic button which when depressed notifies the cell phone via Bluetooth.

(6) The system may include means for monitoring various capabilities such as, for example, checking of the level of the spraying substance as well as the level of charge of the personal safety device battery which impacts the amount of voltage that may be applied by the shocking mechanism. Additionally, the user can monitor the strength of signal between the personal safety device and the associated cell phone to make sure that signals sent by the personal safety device may be effectively received by the cell phone.

(7) In another aspect the present invention contemplates a wireless optical safety device that is self-contained but, when activated, communicates with a cellular telephone while also providing assailant detection capabilities.

(8) Through use of the present invention, a user may feel safe while carrying a personal safety device that can not only provide self-help through shocking or spraying an assailant, but may also communicate with a cell phone that permits authorities to quickly locate a crime victim and protect them from further harm.

As such, it is a first object of the present invention to provide a wireless personal safety device that may be contained in a hand held housing.

It is a further object of the present invention to provide such a device which wirelessly communicates with a cell phone to enable transmission of information concerning an attack to authorities and social media.

It is a further object of the present invention to provide such a system in which a personal safety device may be equipped with a shocking mechanism.

It is a still further object of the present invention to provide a personal safety device that may be equipped with a spraying apparatus designed to spray a noxious spray onto an assailant.

It is a further object of the present invention to provide such a device which may include a panic switch allowing manual activation of notification.

It is a yet further object of the present invention to provide such a device in which a sensor can sense the spacing between a personal safety device and an associated cell phone and trigger remote notification when the spacing exceeds a pre-set distance.

It is a still further object of the present invention to provide a wireless optical safety device.

It is a yet further object of the present invention to provide a wireless optical safety device that is self-contained but, when activated, communicates with a cellular telephone while also providing assailant detection capabilities.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
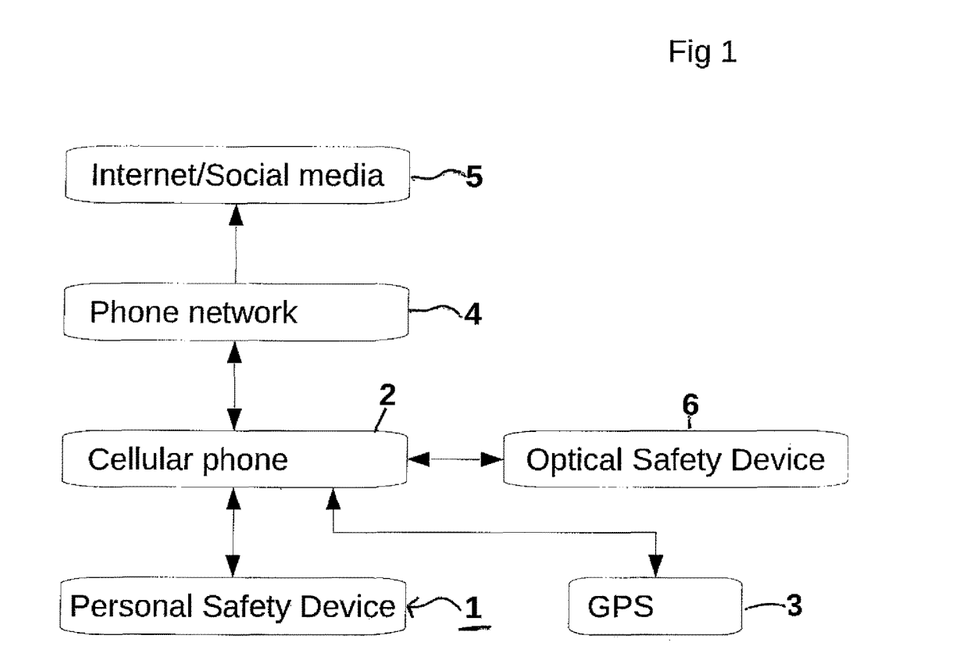
FIG. 1 is a schematic of the main components associated with the Personal Safety System (PSS).

FIG. 1 represents the main components of the Personal Safety System (PSS) invention. The personal safety device (PSD) 1 is battery powered 109 (FIG. 2B) and contains self-defense mechanisms such as a shocking mechanism and a spray mechanism to subdue or discourage a would-be attacker. The PSD 1 is tethered to a cellular phone 2, over a Bluetooth system. The optical safety device (OSD) 6 is battery powered (287) (FIG. 3) and contains camera component used to identify and track potential assailants coming from behind. The OSD 6 is tethered to a cellular phone 2, over a Bluetooth system 290, 291 (FIG. 3). The cellular phone 2 contains an internal Global Positioning System (GPS) 3 that provides location information of the whereabouts of the cellular phone, and therefore presumably of the cellular phone owner. The cellular phone 2 communicates over a cellular phone network 4 to provide interconnectedness to the phone network and the Internet 5. The phone network 4 allows the user to summon help over the phone network (calling 911 or calling another person directly). The Internet 5 also has linkages to various social media for summoning help over social media, such as, for example, Facebook. Also, as is known in the art, GPS is sometimes aided by location information obtained by triangulation involving cellular phone towers. U.S. Pat. No. 5,515,419 discloses this aspect.

Figures 2A, 2C:
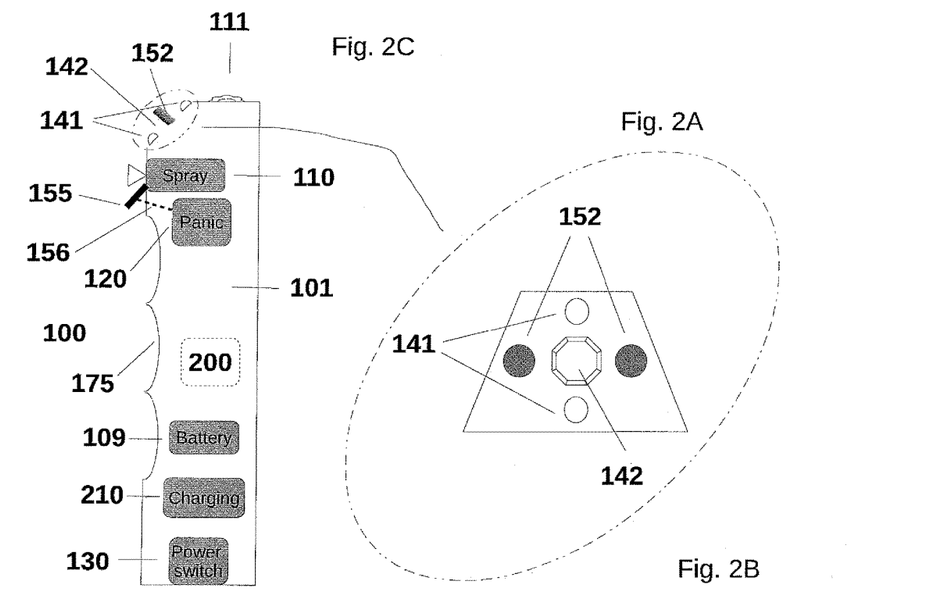
FIGS. 2A, 2B and 2C show a schematic representation (FIG. 2A), a block diagram (FIG. 2B), and the hand held housing (FIG. 2C) of the Personal Safety Device of the present invention.
Figure 2B:
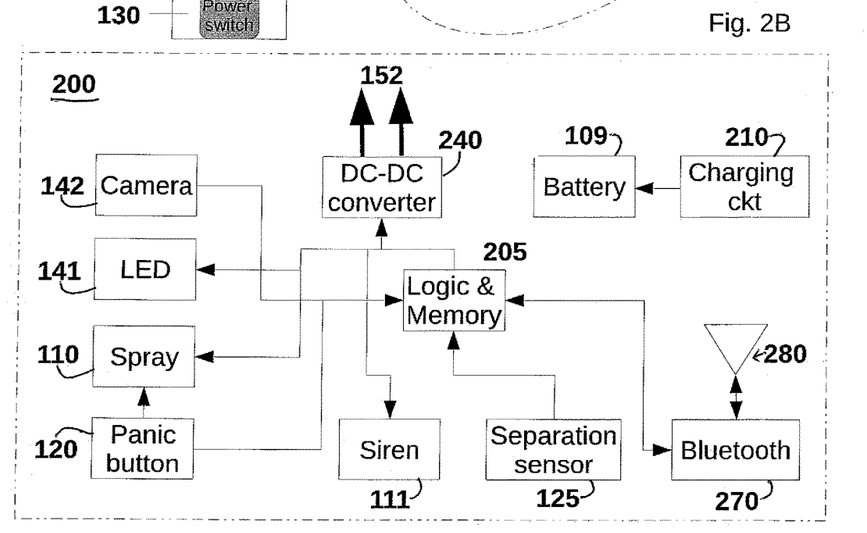
Figure 3:
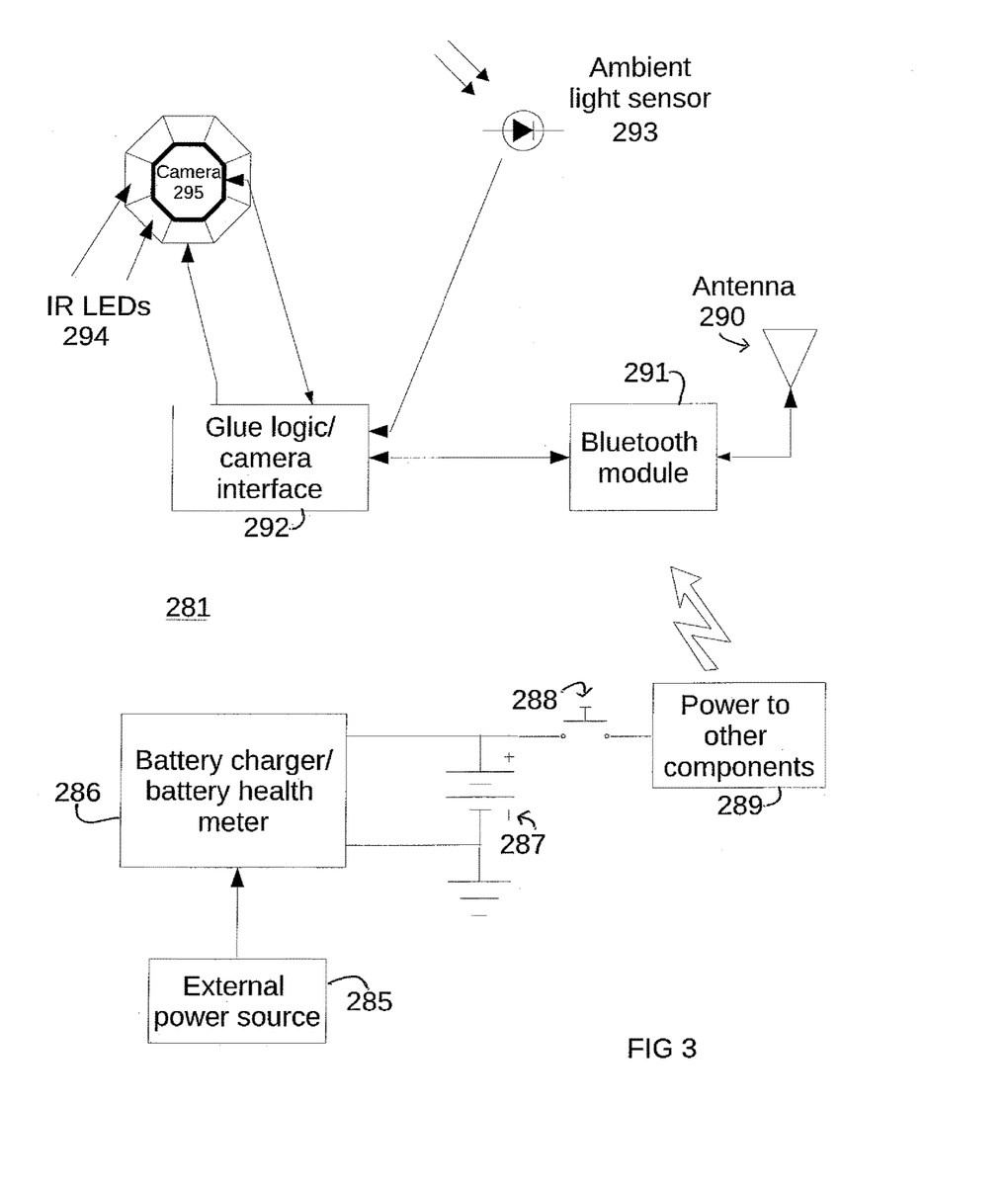
FIG. 3 is a schematic of the Optical Safety Device of the present invention.

Referring now to the invention in more detail with reference to FIGS. 2A, 2B and 2C, in FIG. 2C there is shown a block diagram of the PSD 100. Housing 101 contains a power on/off switch 130 and can be either a mechanical or software based switch and enables the PSD's functionality. This could include activating the logic and memory block 205 (FIG. 2B), which would then enable via software the Bluetooth block 270 (FIG. 2B), the separation sensor 125 (FIG. 2B), and put various other blocks such as camera 142, LEDs 141 (FIG. 2A), panic button 120 (FIG. 2C), siren 111, and DC-DC converter block 240 (FIG. 2B) into a steady state. Referring to FIG. 2C, the PSD 100 has a housing 101 that contains a receptacle or other mounting arrangement such that a self-defense mechanism comprising a pepper spray package 110 or other equivalent noxious spray sprayer can be attached to the PSD 100. Scalloped recesses 175 (FIG. 2C) are provided to facilitate gripping the housing with the hand of the user. Off the shelf pre-packaged units of spray 110 are available commercially. Such units may also contain ink for marking an assailant. Alternatively, a custom version of the contained spray may be employed that integrates specifically with the PSD. An example of a custom contained spray is one in which spray activation switch 155 on the contained spray is designed to also engage the panic button switch 120 via linkage 156. In this way, activation of the spray via nozzle 152 indicates an emergency situation, alleviating the need for two separate actions. The linkage 156 can be instrumented mechanically, or through another sensing modality, such as optical or capacitive sensing, as is known in the art. Alternatively, engaging the panic switch might cause the activation of the spray 110 via a feedback mechanism controlled by logic and memory unit 205 (FIG. 2B). Panic switch 120 also allows the stun gun to be enabled for use. A description of a stun gun is disclosed in U.S. Pat. No. 4,688,140, incorporated herein by reference. Blocks 152 are the stun gun electrodes, which are placed against a perpetrator's skin in order to disable the perpetrator. Alternatively, where allowed by law, a more lethal defense mechanism may be deployed and activated. Also enabled when panic switch 120 is pressed is the camera 142 and LEDs 141 (FIG. 2A). The LEDs 141 provide light for camera 142 to capture images of the assailant, which are then saved to the memory of logic and memory block 205. These images may also be sent over Bluetooth block 270 and antenna 280 (FIG. 2B) to the cellular phone 2 (FIG. 1) for saving or forwarding to other parties such as social media contacts, police, etc. The antenna 280 facilitates transmission of wireless signals from the PSD to a cellular telephone. LEDs 141 may be IR or white or some combination to allow picture capture to occur during either daytime or nighttime. The LEDs may strobe or flash in an annoying manner to disorient the assailant. Also enabled when panic switch 120 is pressed is the siren 111 (FIG. 2C), which emits a loud sound, calling attention to the present situation. The siren may also be a speaker, which can announce to an assailant that the crime he is committing is being captured and sent to the police.

With reference to FIG. 2B, block 200 schematically represents the other hardware found in PSD 100. Block 210 is a charging circuit that allows the PSD 100 battery 109 to be charged up for use. The input to this charging circuit can be, for example, from a wall mounted transformer, USB cable or charging pad. Which input is used depends on the design of charging circuit 210 and, as known in the art, this can take on numerous forms, e.g., AC-DC converter using a direct or transformer coupled AC input, DC regulation using an unregulated DC input, etc. Battery 109 is a rechargeable type battery, preferably using lead-acid, nickel cadmium (NiCd), nickel metal hydride (NiMH), lithium ion (Li-ion), and lithium ion polymer (Li-ion polymer) technology, as is known in the art. Battery 109 can also be a non-chargeable type, eliminating the need for charging circuit 210. Whatever battery is used, it must be sized appropriately. Battery 109 is used to power the Bluetooth circuitry 270 and the DC-DC converter 240 that converts the low battery voltage to a high voltage potential across electrodes 150 for shocking. Switch 130 (FIG. 2C) turns the PSD on. This includes activating the logic and memory block 205 (FIG. 2B), which would then enable via software the Bluetooth block 270, the separation sensor 125, and put various other blocks such as camera 142, LEDs 141, panic button 120, siren 111 and DC-DC converter block 240 into a ready state. A separation sensor 125 senses separation distance from the associated cell phone by measuring signal strength. If signal strength dips below a pre-set threshold, an alarm is sent to the cell phone. This is reported to logic and memory block 205 which can then send this information over Bluetooth to the cellular phone 2. When panic button 120 (FIG. 2C) is pushed, the logic and memory block 205, using suitable software within, turns on the siren 111, the camera 142 and LEDs 141 for recording images and blinding, the siren 111 for attention getting, and the Taser formed from blocks 240 and 152. Recorded images are saved in logic and memory block 205 for eventual retrieval and are also sent to the cellular phone 2 for saving and forwarding to other parties such as social media contacts, police, etc.

Referring now to the invention in more detail, in FIG. 3 there is shown a block diagram of the OSD 281. The OSD 281 is a self-contained module that can snap onto the back of an article of clothing, can be attached with Velcro® fastener onto an article of clothing, attached onto a rear facing earpiece, etc., as is known in the art. Components of the OSD can also be located within the housing 101. Like many portable electronic objects, it is battery 287 powered, where the battery technology can be chosen to optimize performance. An external power source 285, such as mains power, supplies unregulated power to charger/battery-health circuitry 286. Charger/battery-health circuitry 286 conditions the power so that the battery can be charged and also provides an indication of battery 287 charge. Switch 288 is the user power switch. When switch 288 is engaged battery 287 power is further regulated and modified by block 289 to power the remaining components 291-295.

With further reference to FIG. 3, the camera 295 is an infrared (IR) camera, useful for viewing in darkness and IR light. IR light is provided by IR LEDs 294. This light is invisible to humans, thereby also concealing the fact that the OSD 281 is active. While other cameras can be used, the IR camera provides less data to process (monochromatic vs. color), simplifying the detection of a rear approaching assailant. Ambient light sensor 293 is a semiconductor device that senses the ambient light level. This information is incorporated in the camera interface/logic module 292 to control the intensity of the IR LEDs 294. When daylight is sensed the IR LEDs 294 are turned off. As the ambient light decreases the IR LEDs 294 are slowly turned up in intensity so that the IR camera 295 always has adequate light for assailant detection. Image data from the camera 295, suitably processed by interface 292, is sent to Bluetooth module 291, where it is transmitted to the cellular phone 2 for image processing and analysis. As shown by the arrows, information from the cellular phone 2 can also provide some control over the camera 295 such as update rate, aperture, etc.

Figure 4A:
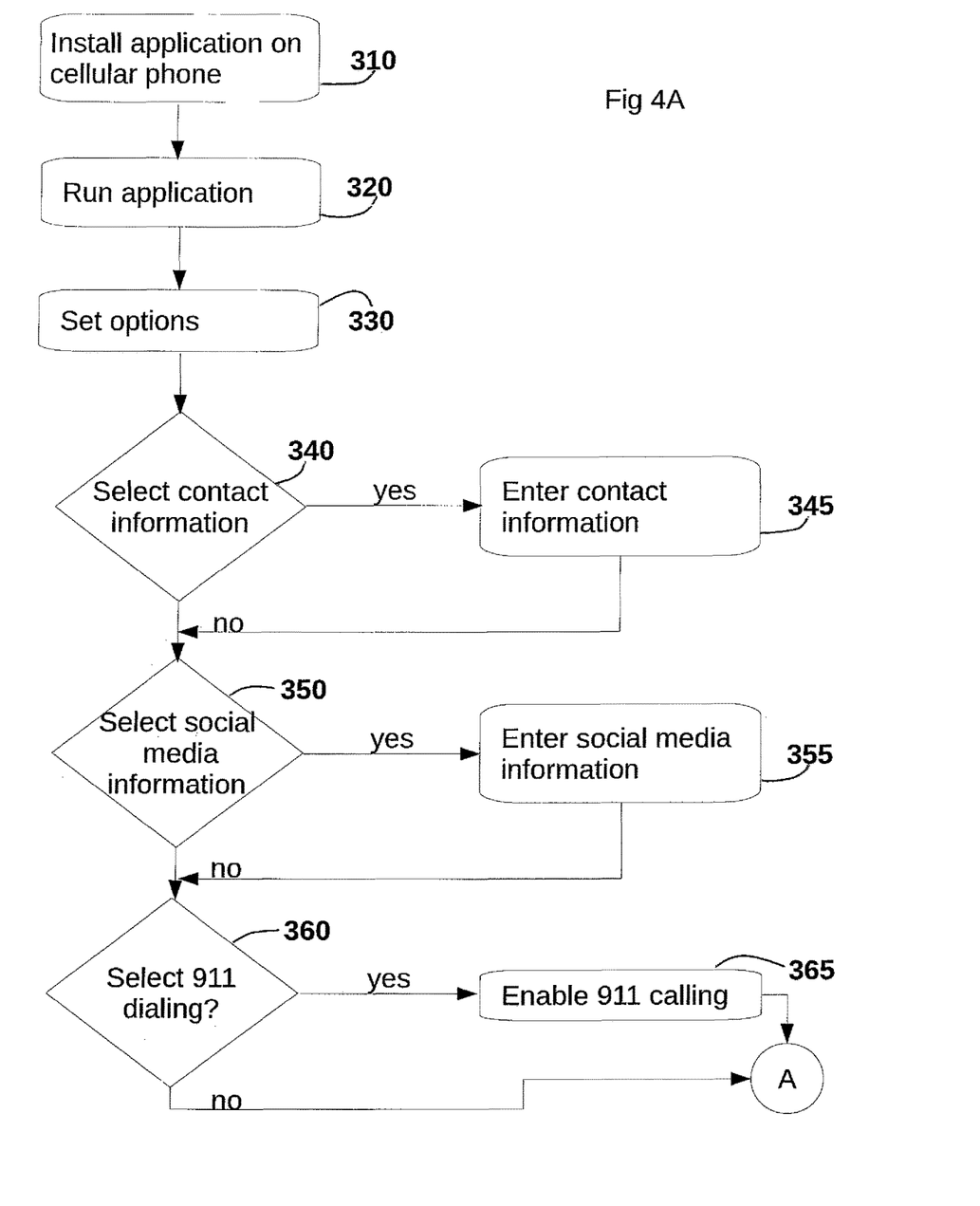
FIGS. 4A and 4B show a flowchart of the application installer software on the cellular phone.
Figure 4B:
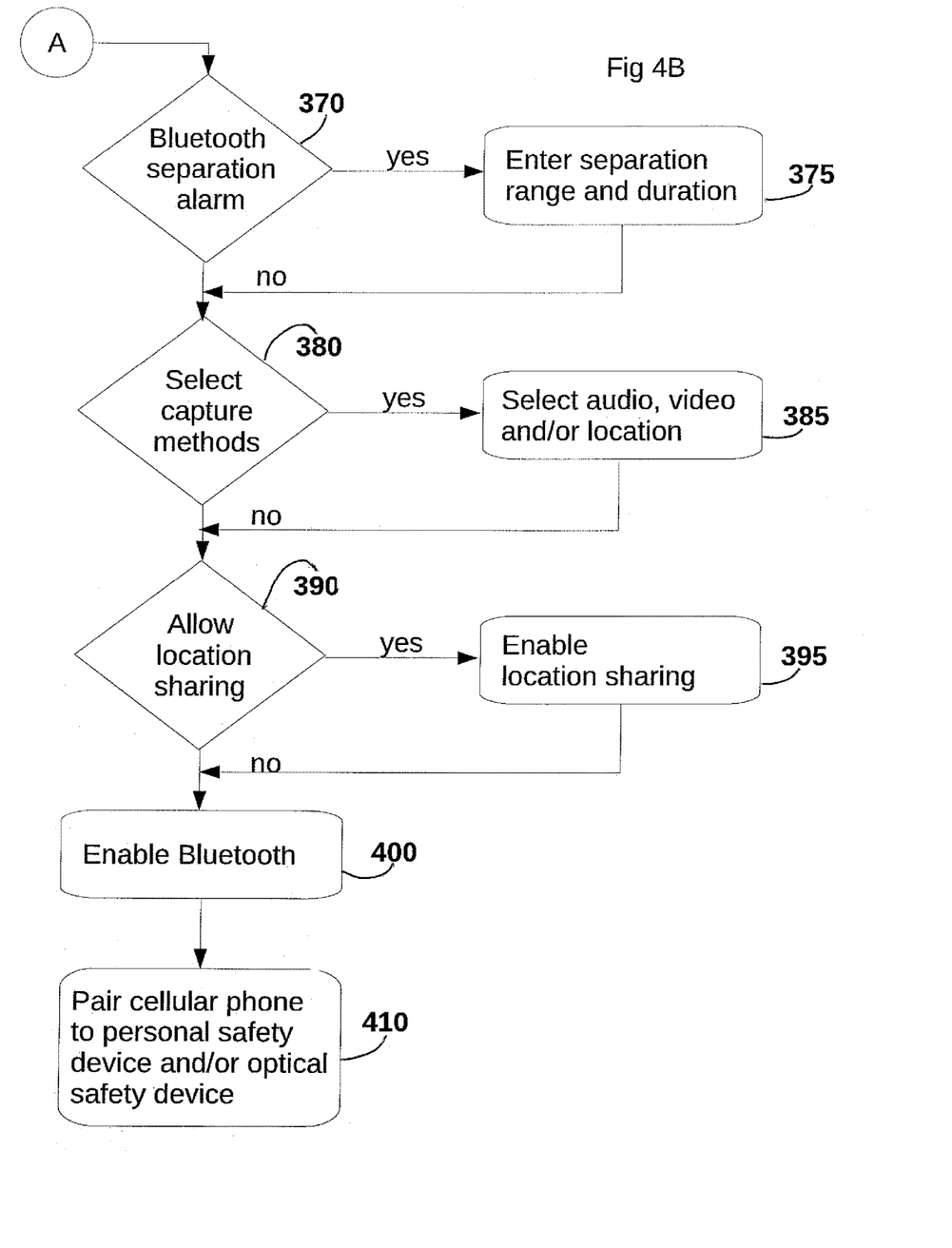

Referring now to the invention in more detail, in FIGS. 4A and 4B there is shown a flowchart of the software installer used to install the PSS application onto the cellular phone. Block 310 represents the user installing the application on the cellular phone. As is known in the art, this is accomplished by downloading the application from one of the various vendors' software repositories, such as the Apple store or Google. Play. Once the application is installed, the user runs the application in Block 320. The user is then prompted to set various features and options that control how the cellular phone connects with other users of the network and how the cellular phone interacts with the PSD, as denoted by Block 330. Various options are now selected. In Block 340, the user is asked if they would like to enter/add contact information. Such information can be a phone number, cellular and/or landline, an address, either physical and/or e-mail, etc. If the answer is yes, the user enters the desired data in Block 345. In Block 350, the user is next asked if they would like to enter social media contact information. Such information can be links for posting to Facebook, Twitter, and other social media sharing sites. If the answer is yes, the user enters the desired data in Block 355. In Block 360, the user is asked if they would like to add 911 emergency calling. If the answer is yes, the information is saved in Block 365.

In Block 370 (FIG. 4B), the user is asked whether to enable the separation sensor and alarm. This alarm is triggered when the PSD and the cellular phone are separated by a certain distance. This distance is based on the received signal strength indicator (RSSI) indicator. There is no standardized relationship between range and the RSSI reading, so this can only be used as an approximate distance measure, but it is sufficient. If enabled, the approximate distance is entered in Block 375. Additionally, related timing information can be entered, such as how long the devices are separated before enabling the alarm, giving the owner time to bring the PSD and cellular phone together again. In Block 380, the user is asked what capture methods should be enabled to capture audio, video and location information. If selected, the user enters or checks the various methods. Block 390 asks the user whether location sharing should be enabled. Location sharing is a feature that allows you to let people know where you are. Both Wi-Fi positioning system and GPS are used to pinpoint the user's location as accurately as possible. If it is desired, then it is enabled in Block 395. Block 400 is then reached where Bluetooth is enabled in the cellular phone. Once enabled, the user is asked to turn on the PSD and/or the OSD so that the cellular phone can be paired to the appropriate devices in Block 410. This is a standard method of using Bluetooth as is known in the art.

Figure 5:
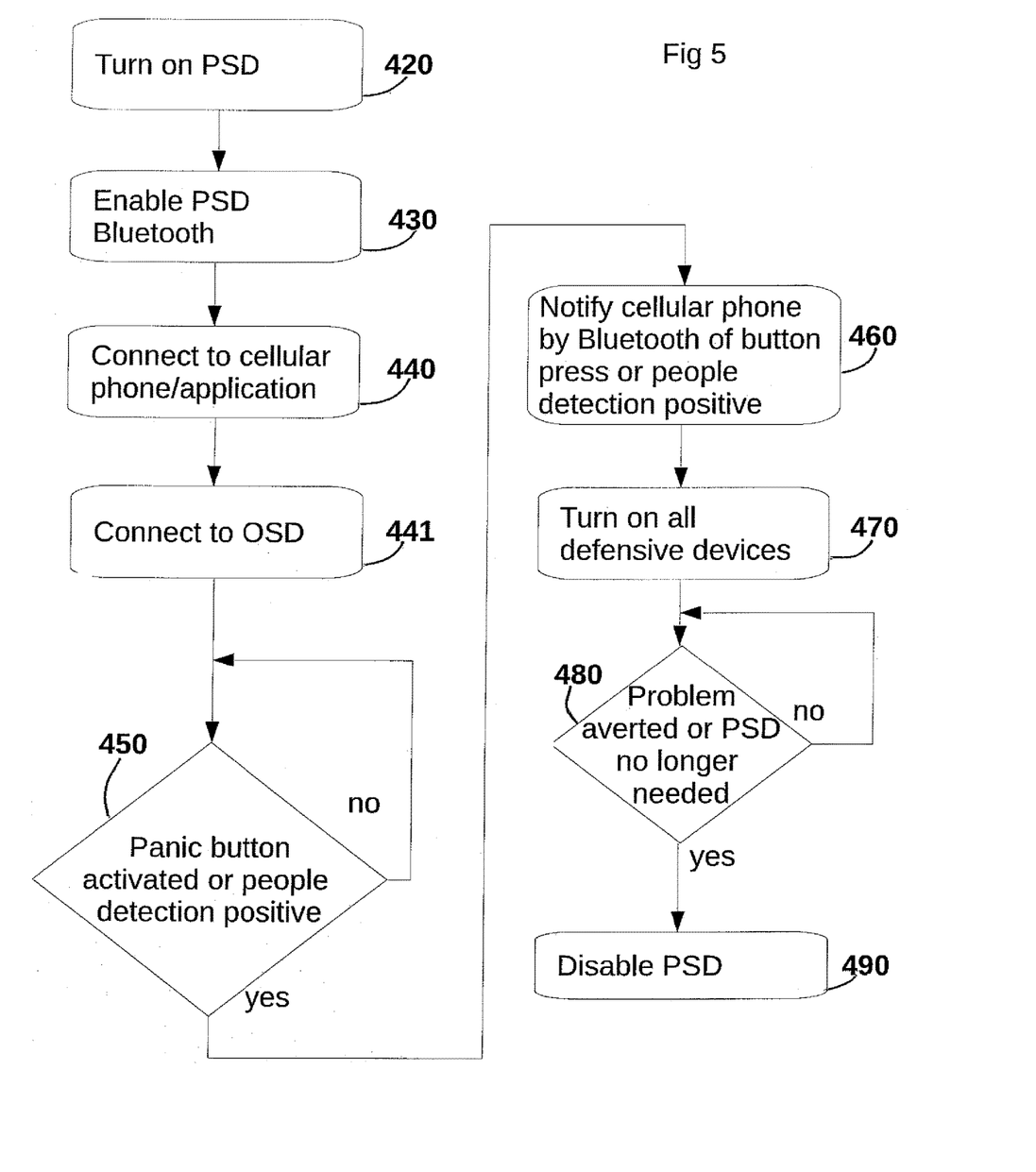
FIG. 5 is a flowchart of the software running on the Personal Safety Device (PSD).

Referring now to the invention in more detail, in FIG. 5 there is shown a flowchart of the software running on the PSD. In Block 420, the user turns on the PSD using switch 130 (FIG. 2C). Once the PSD is on, Bluetooth is enabled in Block 430 and the PSD connects to the cellular phone in Block 440. Block 450 shows the loop where the panic button of FIG. 2C, block 120, is monitored. When the panic button is activated, the cellular phone is notified via Bluetooth in Block 460 of the button press. Next, all the defensive devices are activated in Block 470. This includes spray 110, camera 142, LEDs 141, Taser components 152 and 240, siren 111, and separation sensor 125. This can be an automated process as shown or is accomplished by the user enabling switch 130 (FIG. 2C). This allows the stunner to charge up to a debilitating voltage using the DC-DC converter of FIG. 2, Block 240, from a low voltage battery source (FIG. 2B, Block 109). The PSD stays in this state of usefulness based on Block 480 until the situation is clear, meaning that the user is no longer needing the protection offered by the PSD. This is accomplished by turning the unit off using the power button in FIG. 2C, Block 130, disabling block 240 using switch 130 or other means. In some embodiments, the power switch is a soft power switch, meaning that the power is never actually off, just sitting in a quiescent state, waiting for the power switch to be activated again. In other embodiments, the power switch 130 is configured to respond to voice command and control. In yet another embodiment, the OSD itself is in a quiescent state but capable of capturing and streaming images when it senses a threat. In this way, the user need not worry about turning the device on. It is always present.

Figure 6:
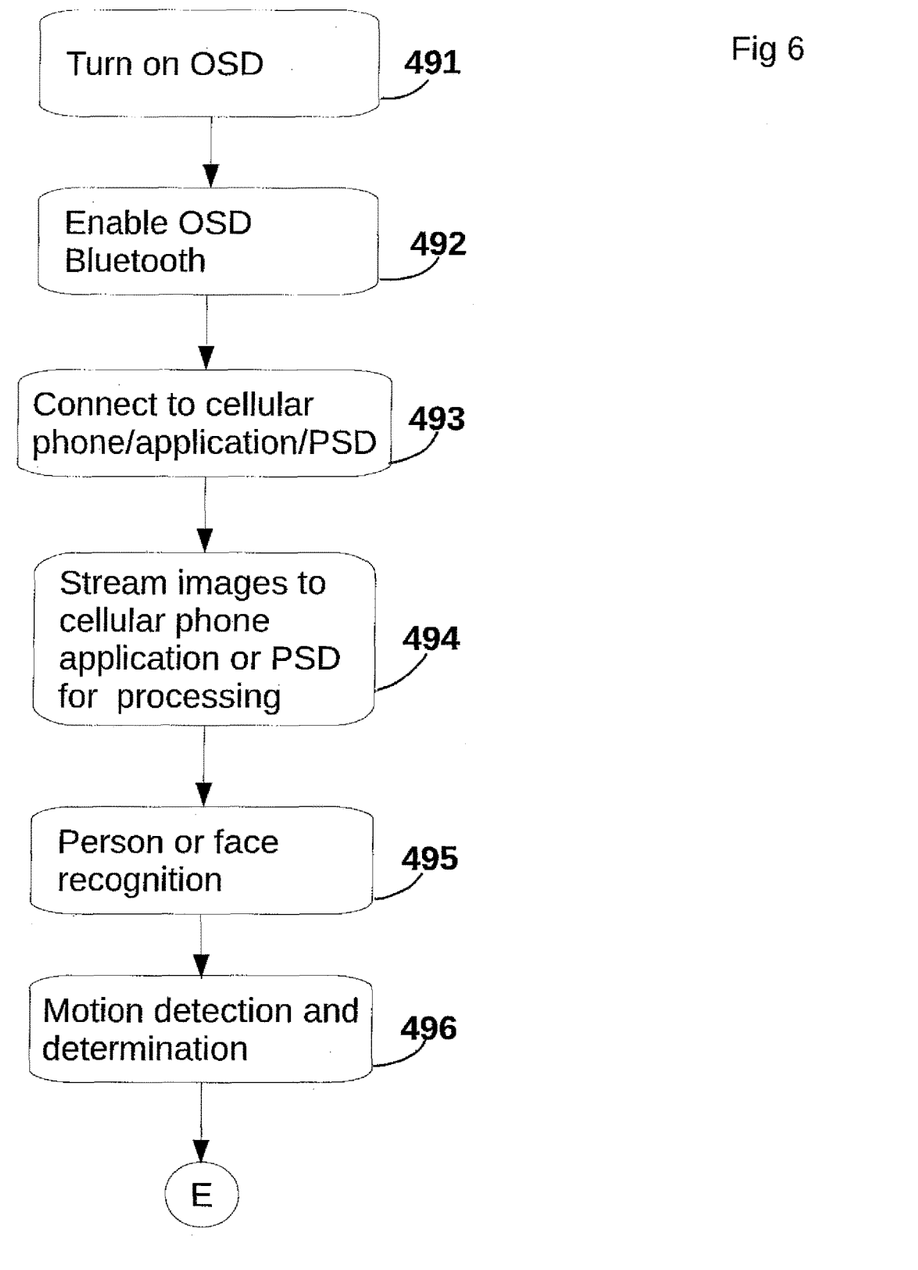
FIG. 6 is a flowchart of the software running on the Optical Safety Device (OSD).

Referring now to the invention in more detail, in FIG. 6 there is shown a flowchart of the OSD software running on both the OSD 281 and the cellular phone 2. In Block 491, the user turns on the OSD using switch 288 (FIG. 3). Once the OSD is on, Bluetooth is enabled in Block 492 and the OSD connects to the cellular phone in Block 493. Block 494 shows where the streaming images are sent to cellular phone 2. These images are from camera 295, which are transmitted via Bluetooth 291. This happens continuously at a fixed rate, or at least with a timestamp attached to the image. This process may also be performed in a parallel manner, such as in a separate thread, since the processing is more intensive than the rest of the PSS software, as is known in the art.

Images are first processed in block 495. Block 495 implements a people detection algorithm, as described in "Background Subtraction for Freely Moving Cameras," incorporated herein. The method operates entirely using 2D image measurements without requiring an explicit 3D reconstruction of the scene. A sparse model of background is built by robustly estimating a compact trajectory basis from trajectories of salient features across the video, and the background is 'subtracted' by removing trajectories that lie within the space spanned by the basis. Foreground and background appearance models are then built, and an optimal pixel-wise foreground/background labeling is obtained. Other people tracking algorithms are available, as understood by those skilled in the art, such as one described in "People Tracking via a Modified CAMSHIFT Algorithm," also incorporated herein. This in turn makes use of OpenCV, an open source computer vision library, also incorporated herein to supply an implementation of the Gaussian Mixture Model. The Gaussian Mixture Model performs background subtraction. Background subtraction involves calculating a reference image, subtracting each new frame from this image and thresholding the result. What results is a binary segmentation of the image which highlights regions of non-stationary objects. Shadows are also removed in this block. There are many other ways to perform the same function as blocks 494, including the use of facial recognition instead of people recognition. Facial recognition can be found in open CV, Facereclib (https://pypi.python.org/pypi/facereclib), http://www.face-rec.org/algorithms/and commercial facial recognition software (http://www.luxand-.com/facesdk/).

The results from block 495 are then processed in block 496 using an optical flow algorithm such as the Lucas-Kanade Algorithm. This algorithm is a widely used differential method for optical flow estimation, a version of which can be found in openCV. It assumes that the flow is essentially constant in a local neighborhood of the pixel under consideration, and solves the basic optical flow equations for all the pixels in that neighborhood using a least squares criterion. By combining information from several nearby pixels, the Lucas-Kanade method can often overcome vagaries of the optical flow equation. Other motion detection algorithms can be used, as is known in the art, such as found at http://blog.cedric.ws/opencv-simple-motion-detection.

Figure 7A:
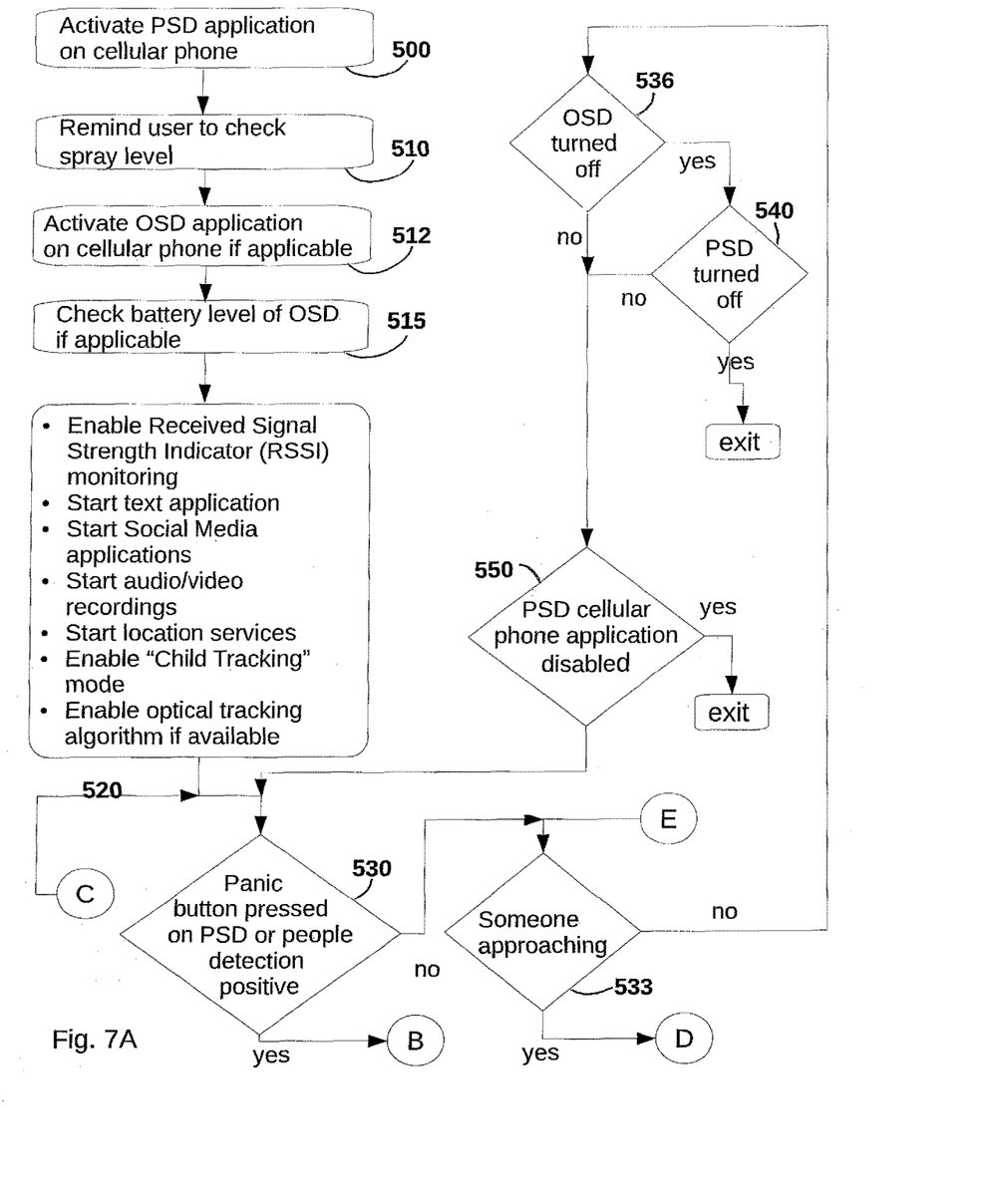
FIGS. 7A, 7B and 7C combine together to form a flowchart of the runtime software on the cellular phone.
Figure 7B:
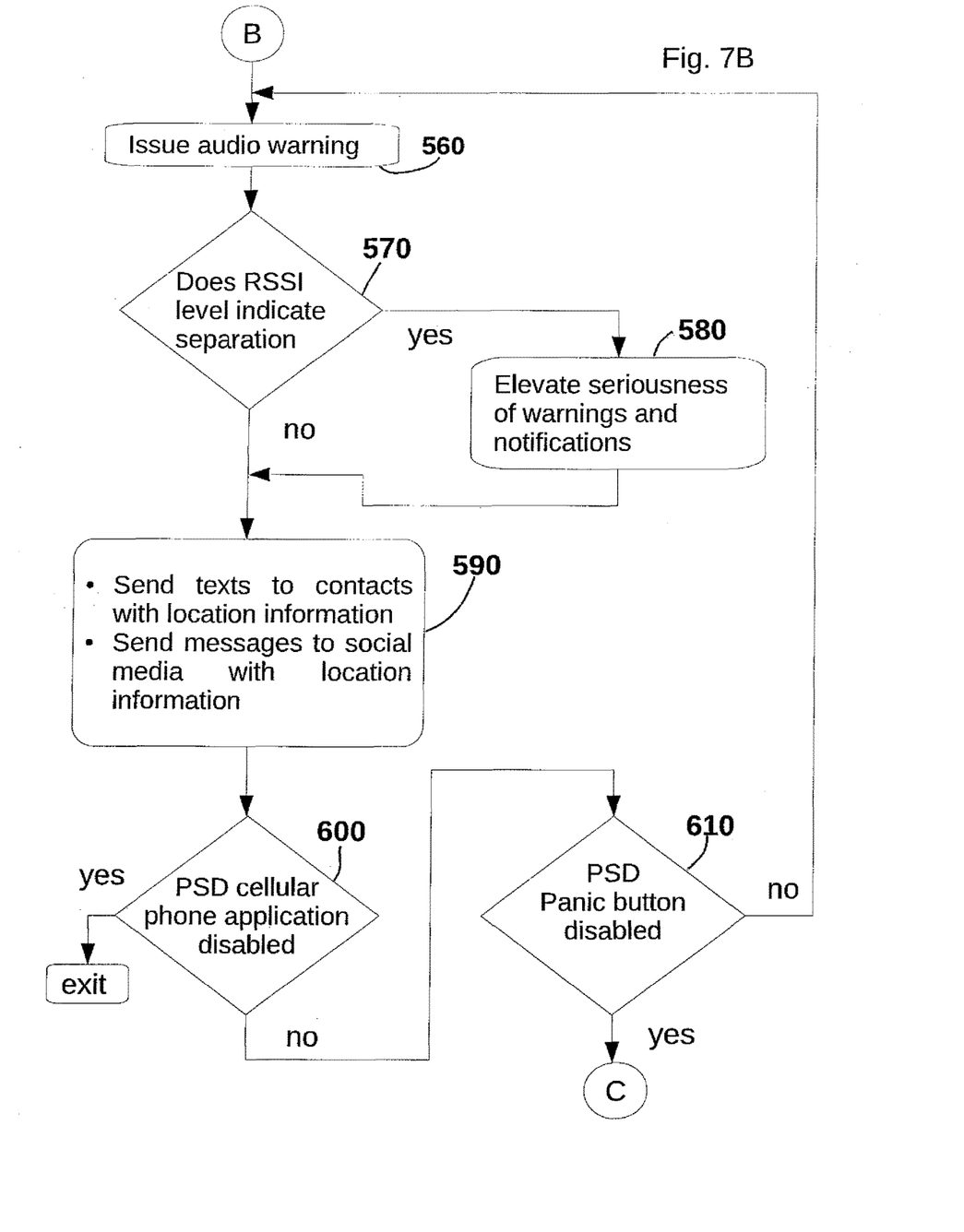

Referring to FIG. 7, additional details of the invention are shown in a flowchart of the software running on the cellular phone. In FIG. 7A, the Block 500 signifies that the user has enabled the PSD application. This can be performed in various user-friendly ways, including double tapping an icon, using speech recognition, etc. The first thing that happens upon startup is a reminder to the user to check the level of the irritant spray in Block 510. Block 512 signifies that the user has enabled the OSD application. This can be performed in various ways, including double tapping an icon, using speech recognition, etc. The first thing that happens upon OSD startup is a reminder to the user to check battery charge, Block 515, if required. Once the reminders are cleared, a number of actions occur in Block 520. This includes enabling the received signal strength indicator (used for separation determination in Block 570), starting the text application for contacting purposes, starting social media applications for constant contact updates, placing on standby audio and video recording applications, enabling locations services and/or child tracking and enabling the optical tracking algorithm that runs concurrently with the other PSS systems. After enabling these processes, a loop is entered where the panic button 120 is constantly monitored in Block 530 and rear assailant approach is noted in Block 533. Block 533 receives input from the assailant tracking algorithm described in FIG. 6. While in this loop, other actions are monitored. In Block 536 the state of the OSD is checked. If it is turned off, the OSD application is terminated. In Block 540, the state of the PSD is checked. If it is turned off, both the OSD and the PSD applications are terminated. If either Block 536 or 540 are not turned off, then a check is made on whether the user has turned the PSS application off in Block 550. If so, the application stops; if not, the loop is repeated.

However, if the panic button is pressed in Block 530, or someone is approaching from behind in Block 533, a different set of actions is initiated. These actions form a loop that continues until the user decides that a threatening situation is over. In Block 560 (FIG. 7B), the cellular phone issues a loud audio warning to the perpetrator. This can take the form of a warning that events are being recorded; emergency personnel are being contacted, etc. The capturing and sending of the data cannot be reversed or canceled by the user or potential perpetrator. The potential perpetrator is notified using a pre-recorded message broadcast via speaker 109 (FIG. 2) or via built in cellular phone 2 speaker that the potential perpetrator's data has been captured by the electronic device, thereby discouraging the potential perpetrator from further proceeding with the crime. Next, in Block 570 (FIG. 7B), a check is made concerning the received signal strength indicator (RSSI) level. If the level indicates separation (a weak signal indicates a larger than expected separation distance), as programmed in Block 375 for a specified time, an elevation of the threat assessment is made in Block 580. All information sent to contacts, social media, etc. in Block 590 are tagged to indicate that the threat has progressed to a more serious level. This can be done with stressor words, numeric levels or color coding, as appropriate. Block 600 (FIG. 7B) checks if the cellular phone application is disabled or not. If so, the application exits. Otherwise Block 610 is executed to see if the panic button has been disabled. If so, control is returned to Block 530. Otherwise the loop is closed by returning to Block 560.

Figure 7C:
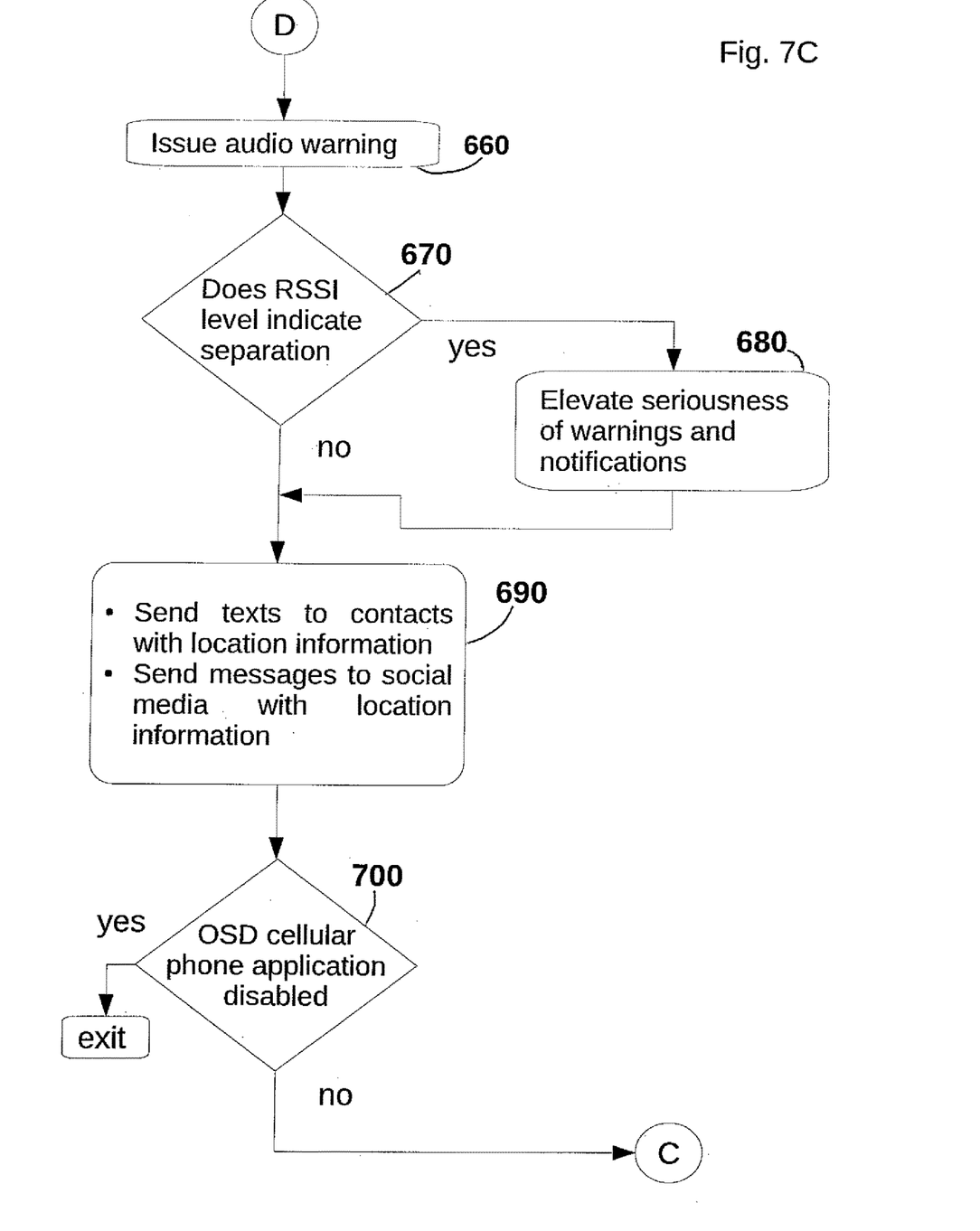

If someone is approaching from behind as discovered in Block 533, a different set of actions is initiated. These actions are part of the loop that continues until the user decides that a threatening situation is over. With reference to FIG. 7C, in Block 660, the cellular phone issues a loud audio warning to the user and possible assailant indicating someone is approaching. This can take the form of a warning that events are being recorded; emergency personnel are being contacted, etc. The capturing and sending of the data cannot be reversed or canceled by the user or potential perpetrator. The potential perpetrator is notified using a pre-recorded message broadcast via built in cellular phone 2 speaker that the potential perpetrator's data has been captured by the electronic device, thereby discouraging the potential perpetrator from further proceeding with the crime. Next, in Block 670, a check is made concerning the received signal strength indicator (RSSI) level. If the level indicates separation of the OSD (a weak signal indicates a larger than expected separation distance), as programmed in Block 375 for a specified time, an elevation of the threat assessment is made in Block 680. All information sent to contacts, social media, etc. in Block 690 are tagged to indicate that the threat has progressed to a more serious level. This can be done with stressor words, numeric levels or color coding, as appropriate. Block 700 checks if the cellular phone application is disabled or not. If so, the application exits. Otherwise the loop is closed by returning to Block 530.

In another embodiment, the Bluetooth module 291 of the OSD 281 (FIG. 3) can transmit data to the antenna 280 and Bluetooth module 270 of the PSD 200 for further processing by logic and memory block 205. This processing can take many forms, from simple to complex. Simple processing can take the form of just forwarding the OSD 281 optical data to the cellular phone 2 (FIG. 1) instead of sending it directly to the cellular phone 2. Complex processing can include having the logic and memory block 205 (FIG. 2B) process the data for people detection instead of or in addition to processing the data for people detection on the cellular phone 2. This processing at the PSD 200 (FIG. 2B) would allow the PSD 200 to self or auto-arm itself before having the panic button 120 pressed. The user could be notified of an approaching assailant by blinking the LEDs 141 (FIG. 2A) in a particular pattern at a lower intensity or using the siren or speaker 111 (FIG. 2C) to put the user in an alert state.

FIGS. 5, 6 and 7 show how this embodiment with complex processing fits into the overall processing scheme. Block 441 of FIG. 5 shows the OSD 281 establishing a Bluetooth connection to the PSD 200. As is known in the art, this will be a background task that will establish a link when the Bluetooth from the OSD becomes available. In block 450, either the panic button 120 or the people detection algorithm output 450 can trigger block 460 to notify the cellular phone of an impending incident. In FIG. 6, block 493, the OSD connects to the cellular phone and/or the PSD once it is powered on. Block 494 shows image data being streamed to either the cellular phone and/or to the PSD for processing. FIG. 7A, block 530, covers the situation where either the panic button 120 is pressed or the people detection algorithm running on logic and memory block 205 detects an assailant, triggering the responses shown in FIG. 7C.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but solely by the terms of the appended claims.

The invention claimed is:

1. A personal safety device system, comprising:
   a) a self-contained integrated personal safety device having a housing and including at least one self-defense mechanism;
   b) said personal safety device enabled by operation of speech recognition software causing said personal safety device to detect speech spoken by a user and including a transmitter for wirelessly transmitting first signals to a cellular telephone on which an application software has been downloaded that facilitates cooperation between said at least one self-defense mechanism and said cellular telephone;
   c) said transmitter being activated to transmit said first signals to said cellular telephone responsive to either (i) activation of said at least one self-defense mechanism, or (ii) manual activation;
   d) said personal safety device system including an optical safety device that continually optically monitors a perimeter surrounding said user carrying said housing including to the rear of said user, said optical safety device wirelessly sending second signals comprising images captured by said optical safety device to said cellular telephone, said optical safety device being programmed with a people detection algorithm facilitating rapid detection of approaching person or persons, said people detection algorithm providing person or face recognition capability enabling said optical safety device to take two-dimensional measurements of a visualization of a potential assailant responsive to said detection of approaching person or persons and processing said measurements;
   e) said second signals providing information to said cellular telephone including that a person or persons is/are approaching said user of said personal safety device and said first signals providing information to said cellular telephone including that said user requires assistance; and
   (f) when said optical safety device senses approach of a person or persons, responsive thereto, said cellular telephone issues an audio warning and subsequently communicates elevation of a threat assessment to at least one third party when a separation sensor senses that a received signal strength indicator (RSSI) indicates a separation distance between said cellular telephone and said personal safety device exceeds an expected separation distance.

2. The system of claim 1, wherein said at least one self-defense mechanism is chosen from the group consisting of a noxious spray, a stunning device and a lethal defense mechanism.

3. The system of claim 1, wherein said at least one self-defense mechanism includes a noxious spray and a stunning device.

4. The system of claim 3, wherein said noxious spray comprises pepper spray.

5. The system of claim 3, wherein said stunning device comprises a battery-powered stun gun incorporated into said housing.

6. The system of claim 5, wherein said stun gun includes two spaced electrodes.

7. The system of claim 4, wherein said stunning device comprises a battery-powered stun gun incorporated into said housing.

8. The system of claim 7, wherein said stun gun includes two spaced electrodes.

9. The system of claim 1, wherein said transmitter incorporates Bluetooth technology.

10. The system of claim 1, wherein when said separation sensor senses separation distance from said associated cellular telephone exceeds an expected separation distance from said personal safety device, said separation sensor activates an alarm.

11. The system of claim 1, further including a global positioning system (GPS) in said cellular telephone which sends signals as to physical location of said cellular telephone.

12. The system of claim 4, wherein said personal safety device includes a monitor of remaining volume of pepper spray within a reservoir contained within said housing.

13. The system of claim 1, wherein said personal safety device is battery powered and activated by voice command.

14. The system of claim 1, further including a speaker and a pre-recorded warning message that may be activated and broadcast via said speaker.

15. The system of claim 1, wherein said housing is sized and configured to be gripped by a hand of said user.

16. A personal safety device system, comprising:
   a) a self-contained battery powered integrated personal safety device having a housing and a plurality of self-defense mechanisms including a noxious spray and a stunning device;
   b) said personal safety device enabled by operation of speech recognition software causing said personal safety device to detect speech spoken by a user and including a transmitter for wirelessly transmitting signals to a cellular telephone on which an application software has been downloaded that facilitates cooperation between said at least one self-defense mechanism and said cellular telephone;

c) said transmitter being activated to transmit first signals to said cellular telephone responsive to either (i) activation of said at least one self-defense mechanism, or (ii) manual activation;

d) said first signals informing said cellular telephone that a user of said personal safety device requires assistance;

e) said personal safety device including a separation sensor and alarm, wherein said separation sensor senses separation distance from an associated cellular telephone and activates an alarm when said distance exceeds a pre-set threshold, said distance being determined by measuring signal strength;

f) an optical safety device continually optically monitoring a perimeter surrounding said user carrying said housing, said optical safety device wirelessly sending second signals comprising images captured by said optical safety device to said cellular telephone, said optical safety device being programmed with a people detection algorithm facilitating rapid detection of approaching person or persons and said optical safety device taking two-dimensional measurements of a visualization of a potential assailant responsive to said detection of approaching person or persons;

(g) said second signals providing information to said cellular telephone including that a person or persons is/are approaching said user of said personal safety device; and (h) when said optical safety device senses approach of a person or persons, responsive thereto, said cellular telephone issues an audio warning and subsequently communicates elevation of a threat assessment to at least one third party when the separation sensor senses the separation distance between said cellular telephone and said personal safety device exceeds the pre-set threshold.

17. The system of claim 16, wherein said noxious spray comprises pepper spray and said stunning device comprises a battery-powered stun gun incorporated into said housing.

18. The system of claim 16, further including a global positioning system (GPS) in said personal safety device which sends signals to a cellular telephone as to physical location of said personal safety device.

19. The system of claim 16, further including a speaker and a pre-recorded warning message that may be activated and broadcast via said speaker.

20. The system of claim 16, wherein said housing is sized and configured to be gripped by a hand of said user and said optical safety device captures and streams images of a threat responsive to sensing said threat.

* * * * *